Dec. 11, 1923.

J. J. RUNDELL 1,476,846

TOPPING KNIFE

Filed Feb. 23, 1921

Inventor
J.J.Rundell,

By
Geo. P. Kimmel. Attorney

Patented Dec. 11, 1923.

1,476,846

UNITED STATES PATENT OFFICE.

JOE J. RUNDELL, OF PIERCEVILLE, KANSAS.

TOPPING KNIFE.

Application filed February 23, 1921. Serial No. 447,047.

*To all whom it may concern:*

Be it known that I, JOE J. RUNDELL, a citizen of the United States, residing at Pierceville, in the county of Finney and State of Kansas, have invented certain new and useful Improvements in a Topping Knife, of which the following is a specification.

This invention relates to implements employed for topping sugar cane, kafir corn, maize and the like, and generally denoted as "topping knives," and has for one of its objects to improve the construction and increase the efficiency of implements of this character.

Another object of the invention is to provide an implement of this character combining a cutting blade and a gathering hook so arranged as to co-operate to reduce the time occupied in using the implement and reducing the labor and fatigue of the operator.

With these and other objects in view, the invention consists in certain novel features of construction as hereinafter shown and described and then specifically pointed out in the claims, and in the drawings illustrative of the preferred embodiment of the invention.

The improved implement comprises a stock 10 in the form of a rod bent into a hook 11 at one end and flattened at 12 at the other end and directed at right angles to the longitudinal axis of the stock and forming a support for a handle 13.

Figure 1:
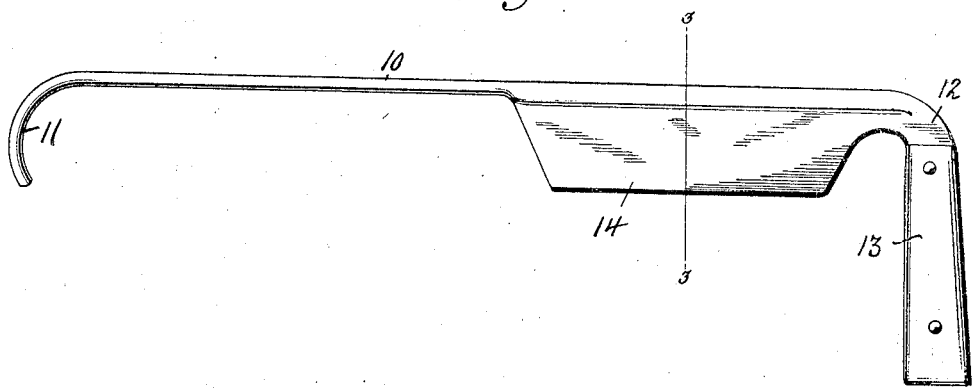
Figure 1 is a side elevation.
Figure 2:
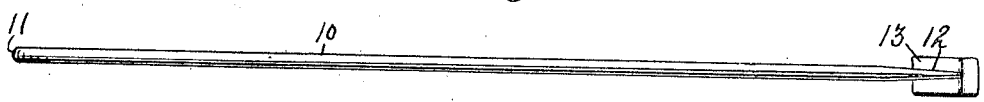
Fig. 2 is a plan view of the improved implement.
Figure 3:
Fig. 3 is a transverse section, enlarged, on the line 3—3 of Fig. 1.

The stock 10 is increased in size adjacent to the handle 13, and depending from the larger portion is a cutting blade 14, the blade, the hook and the handle all being on the same side of the stock, as shown in Fig. 1.

The hook is employed for drawing the plants to be operated on by the blade 14 toward the operator who grasps the material thus gathered with one hand while actuating the blade with the other, and by arranging the hook blade and handle all on one side, or substantially in alinement longitudinally of the stock, there is no necessity for the operator to turn the implement to use the knife. The operator simply draws the stalks toward himself and severs them without turning the implement.

This is an important advantage, and materially increases the value and efficiency of the implement.

The preferred embodiment of the invention is disclosed in the drawings and set forth in the specification, but it will be understood that any modifications within the scope of the claimed invention may be made in the construction without departing from the principle of the invention or sacrificing any of its advantages.

I claim:

1. A topping knife for the purpose set forth formed from a single piece of material and comprising an elongated rigid stock having its forward terminus provided with an integral laterally projecting hook and its rear terminus provided with an integral laterally directed handle support of greater length than the length of the hook, and a cutting blade integral with and projecting laterally from the stock, said blade positioned between the transverse center of the stock and said support, the rear edge of said blade being spaced from said support, and said hook, blade and support projecting from the same side of the stock.

2. A topping knife for the purpose set forth formed from a single piece of material and comprising an elongated rigid stock having its forward terminus provided with an integral laterally projecting hook and its rear terminus with an integral laterally directed handle support of greater length than the length of the hook, and a cutting blade integral with and projecting laterally from the stock, said blade positioned between the transverse center of the stock and said support and having its rear edge inclined from the latter, said hook, blade and support projecting from the same side of the stock.

In testimony whereof, I affix my signature hereto.

JOE J. RUNDELL.